United States Patent [19]

Riis

[11] 4,164,321
[45] Aug. 14, 1979

[54] THERMOSTATIC MIXING VALVE FOR TWO FLUIDS

[75] Inventor: Voldemar Riis, Vårgårda, Sweden
[73] Assignee: AB Vårgårda Armaturfabrik, Sweden
[21] Appl. No.: 854,202
[22] Filed: Nov. 23, 1977
[51] Int. Cl.² ........................................... G05D 23/13
[52] U.S. Cl. ..................................... 236/12 R; 137/90
[58] Field of Search ............ 236/12 R, 93 B; 137/90, 137/625.4, 625.5

[56] References Cited

U.S. PATENT DOCUMENTS

| | | | |
|---|---|---|---|
| 2,828,075 | 3/1958 | Panza et al. | 236/12 R |
| 3,112,879 | 12/1963 | Killias | 236/12 R |
| 3,388,861 | 6/1968 | Harding et al. | 236/12 R |
| 3,540,650 | 11/1970 | Boekelman, Sr. et al. | 236/12 R |
| 3,685,728 | 8/1972 | Chapou | 236/12 R |
| 3,765,604 | 10/1973 | Trubert et al. | 236/12 R |
| 3,961,644 | 6/1976 | Eckert | 137/625.5 X |
| 4,029,256 | 6/1977 | Dauga | 236/12 R |

Primary Examiner—William F. O'Dea
Assistant Examiner—William E. Tapolcai, Jr.
Attorney, Agent, or Firm—Holman & Stern

[57] ABSTRACT

An extremely compact, simple and reliable thermostatically control valve for mixing two fluids of different temperatures comprises means for manual adjustment of volume and temperature of the mixed fluids leaving the valve, wherein said adjustment means are disposed for setting a temperature sensible member adapted to control by means of its thermal expansion the position of a control member which in turn controls the volumes of the different fluids in order to maintain the mixed fluid at the temperature set, the supply of one of said fluids being arranged through a pipe extending through said control member and opening in a first chamber communicating with a second chamber wherein said temperature sensitive member is disposed, said fluids being mixed in either of said first or second chambers, and said second chamber being provided with a further communication duct communicating with the outlet of the valve.

6 Claims, 9 Drawing Figures

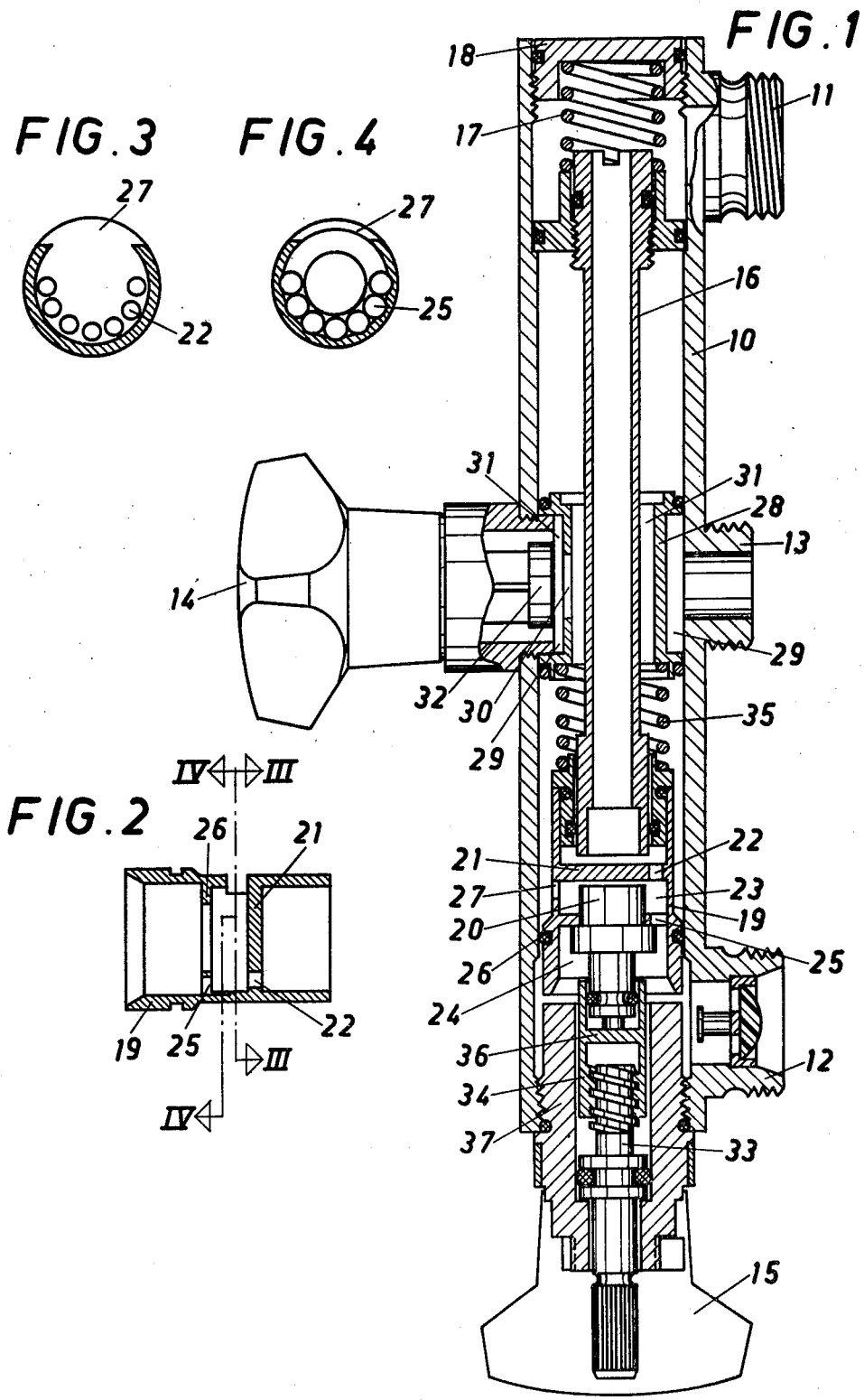

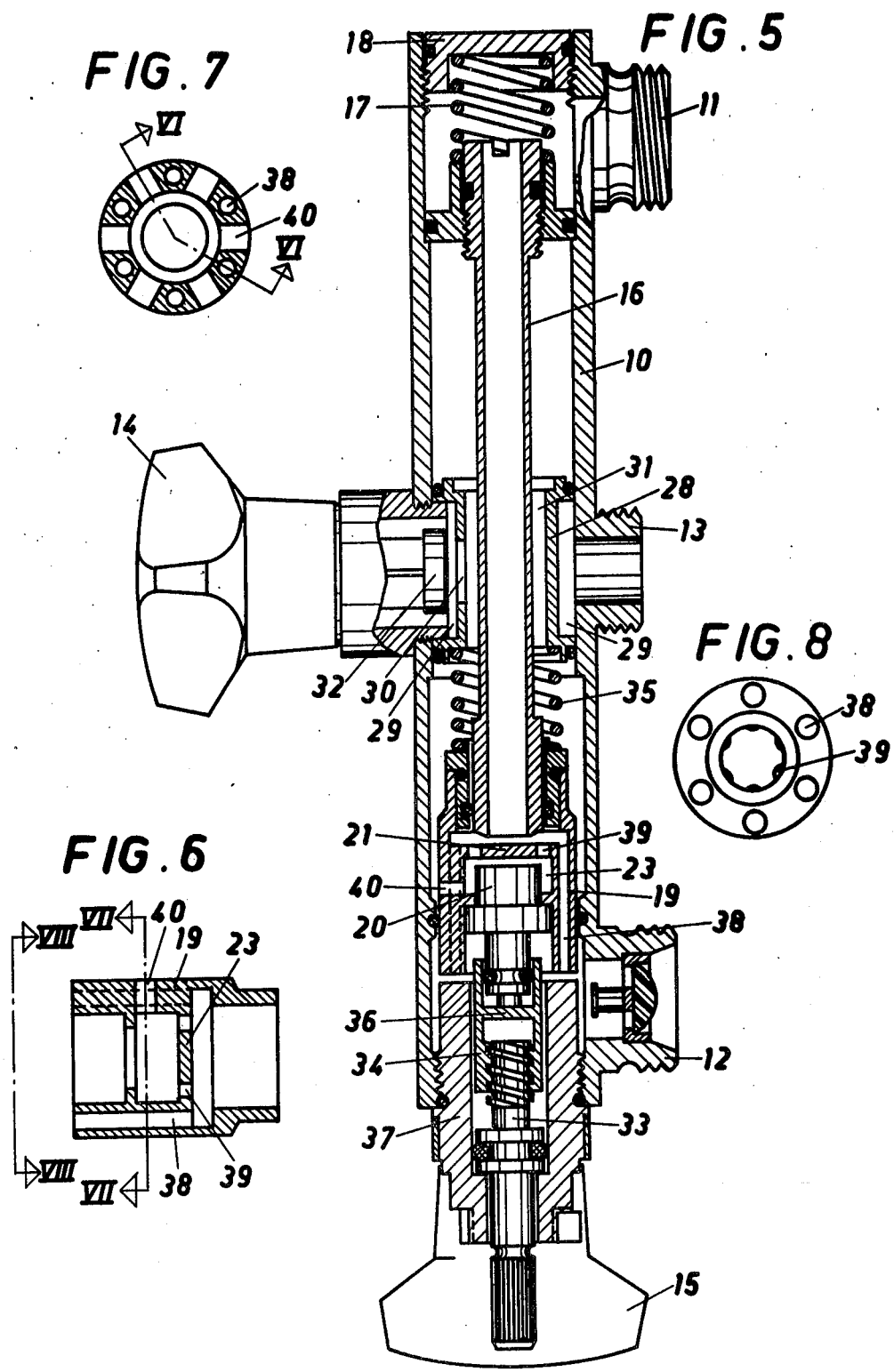

THERMOSTATIC MIXING VALVE FOR TWO FLUIDS

BACKGROUND OF THE INVENTION

The present invention refers to a thermostatic mixing valve for two liquids, e.g. hot and cold water, and comprising an elongated housing provided with an outlet and an inlet each for the liquids, at which a first control knob is arranged for adjustment of the outflow of mixed liquid and a second control knob is arranged for adjustment of the temperature of the mixed liquid by means of a temperature responsive element placed at a control member in such a way that a change of the extension length of the temperature responsive element causes an axial displacement of the control member in the housing and thus causes a changed ratio between the inflow areas of the two liquids, at which one of the liquids is supplied to the control member through a tubular feed pipe centrally placed in the housing.

It has hitherto been necessary to make such thermostatic mixing valves big and bulky, so that they shall be able to hold all the necessary components. The hot and the cold water to the temperature responsive element have been delivered through casted passages in the elongated housing. The casting and the shaping of such a housing is relatively complicated, expensive and requires a lot of material.

SUMMARY OF THE INVENTION

The purpose of the present invention is to provide a thermostatic mixing valve of a simple and compact design and which is less bulky and cheaper to manufacture than previously known thermostatic mixing valves.

This has been achieved by that the end of the feed pipe remote from the inlet is displaceably mounted in said control member, and that the control member comprises a sleeve member axially displaceable in the housing and provided with a partition wall between the outlet of the feed pipe and the temperature responsive element, a number of small apertures for the first liquid flowing to the control member being arranged in said partition wall, at which the first liquid is mixed with the second liquid in front of and/or around the temperature responsive element.

BRIEF DESCRIPTION OF THE DRAWINGS

FIG. 1 is a section through a mixing valve according to one embodiment,

FIG. 2 is a section through the control member of the embodiment according to FIG. 1, FIG. 3 is a section along the line III—III of FIG. 2, FIG. 4 is a section along the line IV—IV of FIG. 2, FIG. 5 is a section through another embodiment of the mixing valve, FIG. 6 is a section through the control member of the embodiment according to FIG. 5, FIG. 7 is a section along the line VII—VII of FIG. 6, FIG. 8 is a section along the line VIII—VIII of FIG. 6.

DESCRIPTION OF THE PREFERRED EMBODIMENTS

Figure 9:
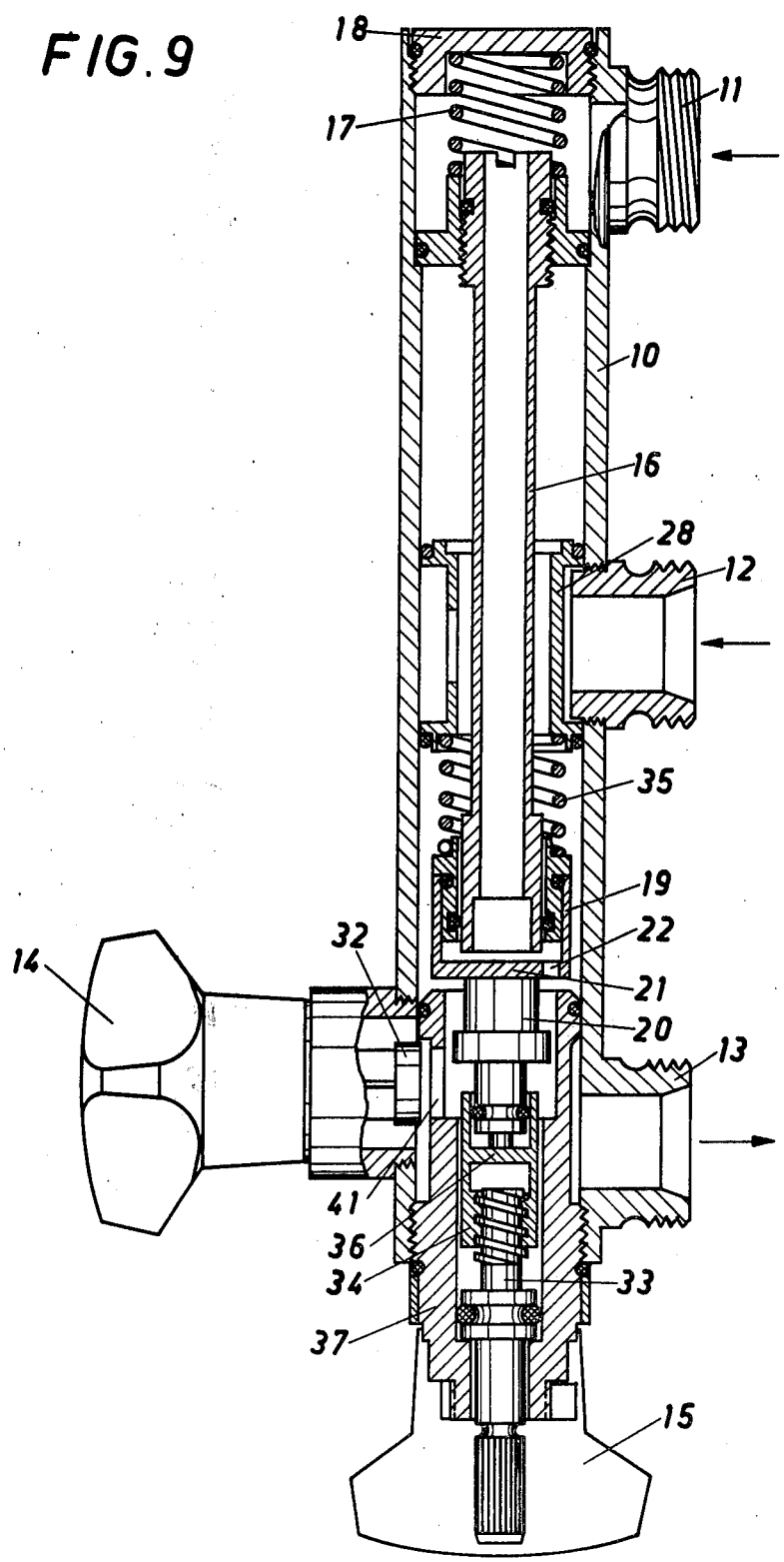
FIG. 9 is a section through a further embodiment of the mixing valve.

According to the embodiments of FIGS. 1-8 the thermostatic mixing valve comprises an elongated housing 10, at one end of which an inlet 11 for e.g. hot water is arranged and at the opposite end of which an inlet 12 for cold water is arranged. At the middle part of the housing 10 an outlet 13 for mixed tempered water is arranged. The flow of the mixed water can be adjusted by means of a first control knob 14 and the temperature of the water can be adjusted by means of a second control knob 15.

One of the liquids, e.g. the hot water, is fed to the mixing valve through the inlet 11 and then flows through a tubular feed pipe 16, which is arranged in the centre of the housing 10 and is springingly mounted in the axial direction. The termination 18 of the housing 10 forms the abutment for the spring 17. The end of the feed pipe 16 remote from the inlet 11 is mounted in a control member 19. The hot water from the feed pipe 16 flows into the control member 19, where it is mixed with cold water, after which the mixed water flows around a wax-filled temperature responsive element 20 arranged in the control member 19 before it flows out through the outlet 13. In the sake of clarity the inlets 11, 12 and the outlet 13 in all the embodiments are shown placed on the same side of the housing, while in reality, due to local conditions, they in most cases are placed on different sides of the housing 10.

According to the embodiment of FIGS. 1-4 the control member comprises an axially displaceable sleeve provided with a partition wall 21, which is provided with a number of small apertures 22 distributed over the upper half of the circumference of the partition wall 21. The hot water flows through the apertures 22 in the partition wall 21 into a first chamber 23 arranged in the control member 19, the front part of the temperature responsive element 20 being received in said first chamber 23. The cold water flows from the inlet 12 through a second chamber 24 arranged in the control member and into the first chamber 23 through small apertures 25 in an inner annular flange 26 of the control member 19. The apertures 25 in the flange 26 are situated just opposite the apertures in the partition wall 21. The hot and the cold water is mixed in the first chamber 23 and flows around the temperature responsive element 20, after which the mixed water flows out through an outlet opening 27 in the control member 19, said outlet opening 27 being situated diametrically opposed to the apertures 22. The water then flows towards the outlet 13.

Within the housing 10 just opposite the outlet 13 a sleeve member 28 is arranged in the longitudinal direction of the housing 10 and surrounding the feed pipe 16. The outer edges of the sleeve member 28 is sealingly contacting the inner wall of the housing 10, while a circumferential channel 29 is formed outside the middle part of the sleeve member, said channel 29 being connected to the outlet 13. The channel 29 is by way of an opening 30 connected to a circumferential passage 31, which is formed between the feed pipe 16 and the sleeve member 28. The water flows into the passage 31 and through the opening 30 to the channel 29 and out through the outlet 13. The opening 30 can be closed by a valve body 32, which is displaced towards and from the opening 30 by means of the first control knob 14 and thus controls the outflow of the water.

The control member 19 is by means of the second control knob 15 by way of a spindle 33, the free end of which being threaded into a sleeve 34, axially displaceable in the housing 10 and is actuated by a spring 35. The end of the sleeve member 28 facing the control member 19 forms the abutment for the spring 35.

The back end of the temperature responsive element 20 contacts a transversal partition wall 36 in the sleeve 34, and the front end of a circumferential flange at the middle part of the temperature responsive element 20 contacts the annular flange 26 in the control member 19. When the control member 19 is displaced upwards in the figures the distance between the outlet of the feed pipe 16 and the partition wall 21 in the control member 19 is decreased, at which the flow of hot water is decreased. At the same time the flow of cold water is increased, since the distance between the end of the control member 19 facing the cold water inlet 12 and a tubular member 37 screwed into the housing 10 is increased, the sleeve 34 being slidingly mounted and the spindle 33 being rotatably mounted in said tubular member 37. An increase of the temperature of the mixed water can be obtained in a corresponding way by displacing the control member 19 downwards in the FIG. 1.

When the temperature of the mixed water exceeds the adjusted temperature the temperature responsive element 20 is expanded, at which the control member 19 is displaced upwards in the FIG. 1 and thereby causes the temperature of the water to decrease to the adjusted temperature. When the temperature of the mixed water is decreased the length of the temperature responsive element 20 is shortened, at which the control member 19 is actuated by the spring 35 and is displaced downwards in FIG. 1 and thereby causes the temperature of the water to increase.

According to the embodiment of FIGS. 5–8 the control member 19 is designed in a somewhat different way. The supply of cold water is made from the inlet 12 through a number of axial passages 38 in the control member to the space between the partition wall 21 and the outlet of the feed pipe 16. The cold water is there mixed with the hot water, after which the mixed water flows into the first chamber 23 of the control member through a number of apertures 39 in the partition wall 21 and then flows around the temperature responsive element 20 and flows towards the outlet 13 through a number of radial apertures 40 in the control member 19. In contrast to the embodiment according to FIGS. 1–4 the cold and the hot water is mixed outside the first chamber 23.

According to the embodiment of FIG. 9 the outlet 13 and the inlet 12 have changed places, so that the water coming from the inlet 12 passes outside the control member 19 and flows in before the partition wall 21, where it is mixed with the water from the feed pipe 16. In this embodiment the partition wall 21 forms a termination wall of the control member 19 and the tubular member 37 extends almost to the partition wall 21, so that only a narrow slot is formed between the partition wall 21 and the front end of the member 37. The width of the slot is changed when the control member 19 is axially displaced, at which the flow of the incoming water from the inlet 12 is adjusted, at the same time as the distance between the partition wall 21 and the outlet of the feed pipe 16 is changed, for adjustment of the flow of incoming water from the inlet 11.

The axial opening in the tubular member 37 is wider at the front part of the member 37 facing the control member 19, and the temperature responsive element 20 is received in this wider part of said opening, at which the front end of the temperature responsive element 20 contacts the partition wall 21 in the control member 19. When the length of the temperature responsive element 20 is changed the control member 19 is axially displaced in the same way as described above. The mixed water flows to the outlet 13 through an opening 41 in the tubular member 37 and said opening can be closed by means of the valve body 32.

What I claim is:

1. A thermostatic mixing valve for two liquids, e.g. hot and cold water, and comprising an elongated housing provided with an outlet and an inlet each for the liquids, at which a first control knob is arranged for adjustment of the outflow of mixed liquid and a second control knob is arranged for adjustment of the temperature of the mixed liquid by means of a temperature responsive element placed at a control member in such a way that a change of the extension length of the temperature responsive element causes an axial displacement of the control member in the housing and thus causes a changed ratio between the inflow areas of the two liquids, at which one of the liquids is supplied to the control member through a tubular feed pipe centrally placed in the housing, wherein said control member is displaceably mounted around the end of the feed pipe remote from the inlet and the control member comprises a sleeve member axially displaceable in the housing and provided with a partition wall between the outlet of the feed pipe and the temperature responsive element, the partition wall limiting the flow of liquid from the outlet of the feed pipe in response to a sensed increase in temperature of the mixed liquid by the temperature responsive element, a number of small apertures for the first liquid flowing to the control member being arranged in said partition wall, at which the first liquid is mixed with the second liquid in front of and/or around the temperature responsive element.

2. A mixing valve as claimed in claim 1, wherein the control member is provided with an inner annular flange having a central opening in which the front part of the temperature responsive element is arranged, and a chamber is formed in the control member between the partition wall, the flange and the front part of the temperature responsive element, at least one outlet opening being arranged in said chamber.

3. A mixing valve as claimed in claim 2, wherein the second liquid is supplied to the chamber, where it is mixed with the first liquid, through apertures in the annular flange, said apertures being arranged just opposite the apertures in the partition wall, and the mixed water from the mixing chamber flows out through said outlet opening, which is situated diametrically opposed to the apertures in the partition wall.

4. A mixing valve as claimed in claim 2, wherein the control member is provided with a number of axial passages, through which the second liquid flows from the inlet to the space between the partition wall and the outlet of the feed pipe, where it is mixed with the first liquid and that the mixed liquid flows into the chamber through apertures in the partition wall.

5. A mixing valve as claimed in claim 1, wherein the partition wall forms a termination wall of the control member, that the front end of the temperature responsive element contacts said partition wall, and the second liquid flows from the inlet past the control member on its outside and in before the partition wall for being mixed with the first liquid.

6. A mixing valve as claimed in claim 1, wherein the feed pipe is springingly mounted in the axial direction in the housing.

* * * * *